United States Patent

[11] 3,575,249

| [72] | Inventor | John Raistakka<br>1414 S.W. 12th Ave., Portland, Oreg. 97201 |
|---|---|---|
| [21] | Appl. No. | 814,945 |
| [22] | Filed | Apr. 10, 1969 |
| [45] | Patented | Apr. 20, 1971 |

[54] SKI-EQUIPPED VEHICLE
5 Claims, 6 Drawing Figs.

[52] U.S. Cl. .................................................. 180/5
[51] Int. Cl. ...................................................... B62m 27/02
[50] Field of Search .......................................... 180/5, 9.24, 9.3, 9.52

[56] References Cited
UNITED STATES PATENTS

| 1,209,404 | 12/1916 | Decker | 180/5 |
| 1,316,232 | 9/1919 | Haupt | 180/9.52 |
| 2,339,886 | 1/1944 | Shannon | 180/5 |
| 2,970,662 | 2/1961 | Hetteen | 180/5 |

FOREIGN PATENTS

| 118,365 | 1/1927 | Switzerland | 180/5 |

*Primary Examiner*—Richard J. Johnson
*Attorney*—James D. Givnan, Jr.

ABSTRACT: Disclosed in the following specification is a ski-equipped vehicle having a powered continuous belt disposed intermediate a pair of skis and vertically positionable relative to the skis. A framework interconnects the skis and supports in a positionable manner the vehicle body. Rack and pinion means are shown to permit raising of the vehicle body and track. Brake means are disclosed for retaining the body in a fixed elevated position on the framework.

INVENTOR.
JOHN E. RAISTAKKA
BY
AGENT

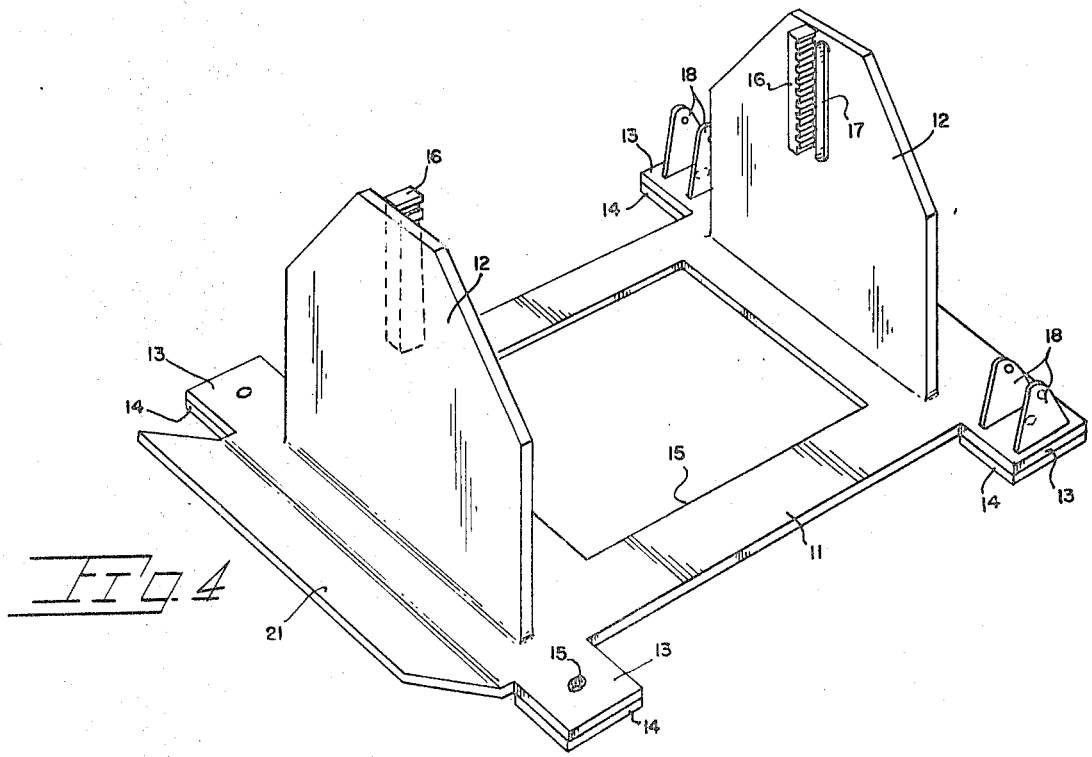
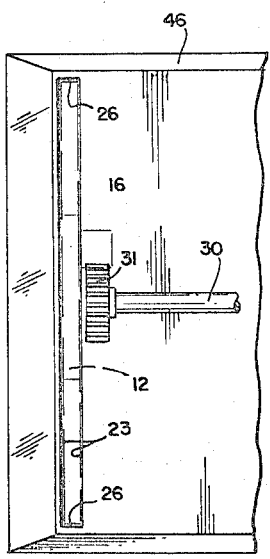
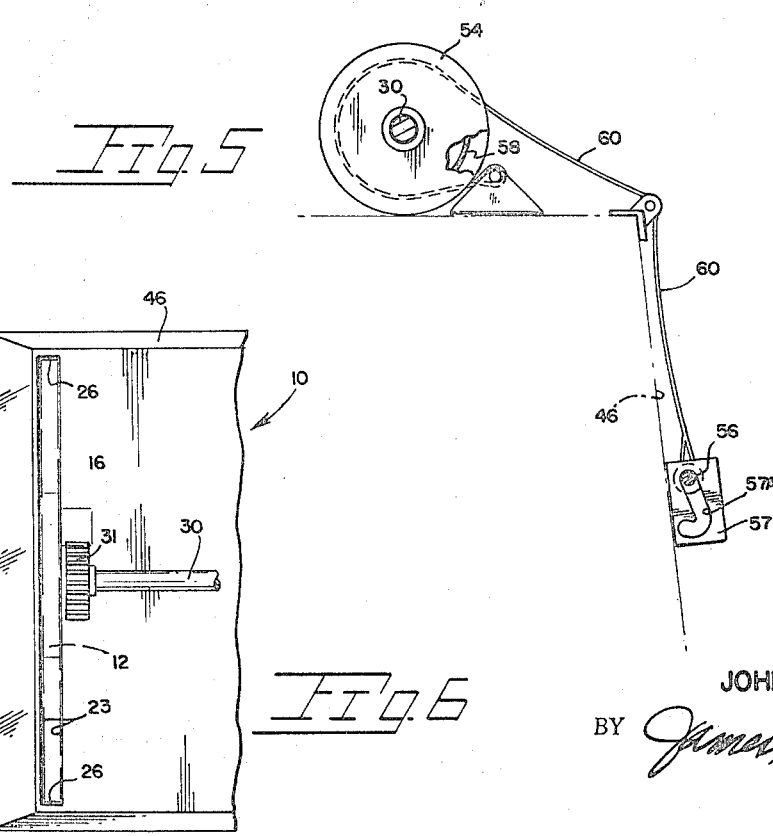
INVENTOR.
JOHN E. RAISTAKKA

SKI-EQUIPPED VEHICLE

BACKGROUND OF THE INVENTION

The present invention relates generally to ski-equipped vehicles having powered continuous belts for propelling the vehicle over the snow.

In the prior art I am aware of numerous types of vehicles are disclosed which typically include steerable ski components and powered belt drives in propelling contact with the surface of the snow. Further, the belt drive, constituting part of the vehicle's traction unit, is movable with respect to the body of the vehicle such being necessary to maintain belt contact in snow when traversing uneven terrain. Most such vehicles are intended for travel under continuous power with the belt in continuous snow contact.

While such snow vehicles have proved successful as evidenced by their wide acceptance they are very costly to purchase and expensive to operate. Further the belt drive of such machines is not readily positionable by the operator while the vehicle is underway. In traveling across more or less level terrain where no coasting is possible this may not be a practical feature but where the terrain does permit coasting such is a very desirable feature for reasons of operating economy and added enjoyment.

In view of the foregoing it is an important object of the present invention to provide a ski-equipped vehicle which permits its operator to quickly and simply position the continuous traction belt upwardly away from the snow surface when desired.

A further advantage is the capability of the present vehicle to provide for adjustment of the driving belt in relation to the supporting ski components of the vehicle. Accordingly the most efficient belt penetration of the snow may be obtained according to the snow surface, e.g., powder, icy, etc.

The present ski-equipped vehicle includes ski members which very similar in shape to conventional skis. An advantage of using such skis is that in the event of mechanical problems the skis may be detached from the vehicle frame and used for cross-country travel.

SUMMARY OF THE INVENTION

The present invention comprehends a ski-equipped vehicle having a body and traction means manually positionable with respect to the ski members and the snow surface. The skis are of generally standard configuration interconnected in a semirigid manner by a frame which also provides upright supports positionably supporting the body. Locking means permit convenient locking of the body at a selected height to achieve the desired and most efficient traction of the continuous belt with the snow.

BRIEF DESCRIPTION OF THE DRAWINGS

In the accompanying drawings:

FIG. 4 is a perspective view of the vehicle's frame, FIG. 5 is a vertical sectional view taken along line 5-5 of FIG. 3, and FIG. 6 is an enlarged detail view of the forward end of the body taken along horizontal line 6-6 of FIG. 3.

DESCRIPTION OF THE PREFERRED EMBODIMENT

Figure 1:
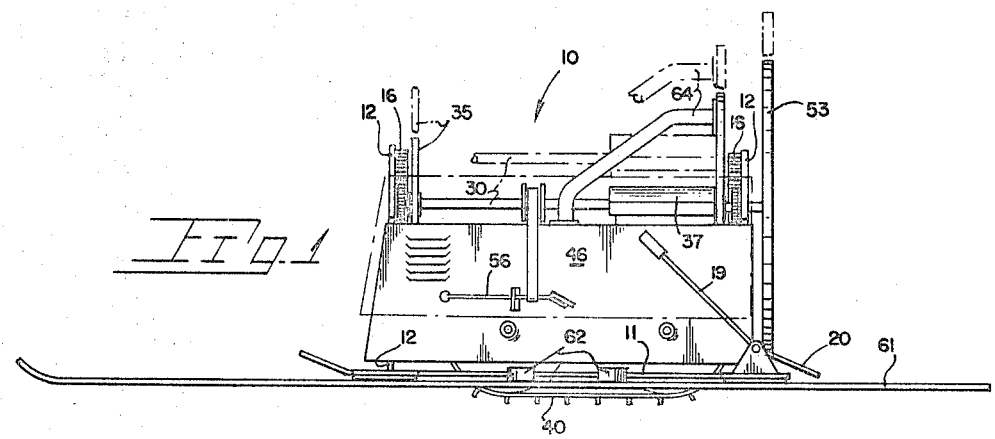
FIG. 1 is a side elevational view of the ski-equipped vehicle embodying the instant invention.

With continuing reference to the drawings wherein reference numerals indicate parts similarly identified in the following specification the reference numeral 10 indicated generally the positionable vehicle body. Indicated at 11 is a vehicle frame having upright or perpendicular supports 12 projecting upwardly beyond the body.

With attention to FIG. 4 wherein the frame 11 is shown in detail, being of generally rectangular in plan view, having outward extensions at 13 which overlie the skis. Affixed to the underside of each extension 13 is a resilient pad or rubber cushion 14 for placement intermediate the upper surface of the ski and the underside of the extension. Each extension and pad 14 are provided with corresponding openings at 15 through which a fastener may pass to secure the ski to the extension. While no particular fastener means are shown a satisfactory arrangement includes a threaded shaft having its lower terminus flush with or inset within the lower surface of the ski and permitting ski movement toward and away from the extension 13 under varying load conditions imposed by flexing of the ski during travel.

With continuing reference to the frame 11 the supports 12 are integral therewith and longitudinally spaced adjacent the front and rear of the frame to carry the vehicle body 10. The frame defines a traction unit opening at 15 (FIG. 4) for passage of the continuous belt downwardly into snow surface contact. At 16 are a pair of gear racks secured centrally to the opposed surfaces of the supports to receive a pinion gear associated with the vehicle body 10 as later described. The rearward support 12 is provided with an elongate slot 17 extending the length of the rack 16 for passage of a shaft carrying the aforementioned pinions. Clevis plates at 18 are affixed to the two rearmost extensions to receive therebetween steering arms shown at 19 in FIGS. 1 and 2 having drag plates 20 attached thereto.

A snow deflector at 21 projects forwardly from the frame 11 to compact the snow downwardly for passage below the frame.

Figure 3:
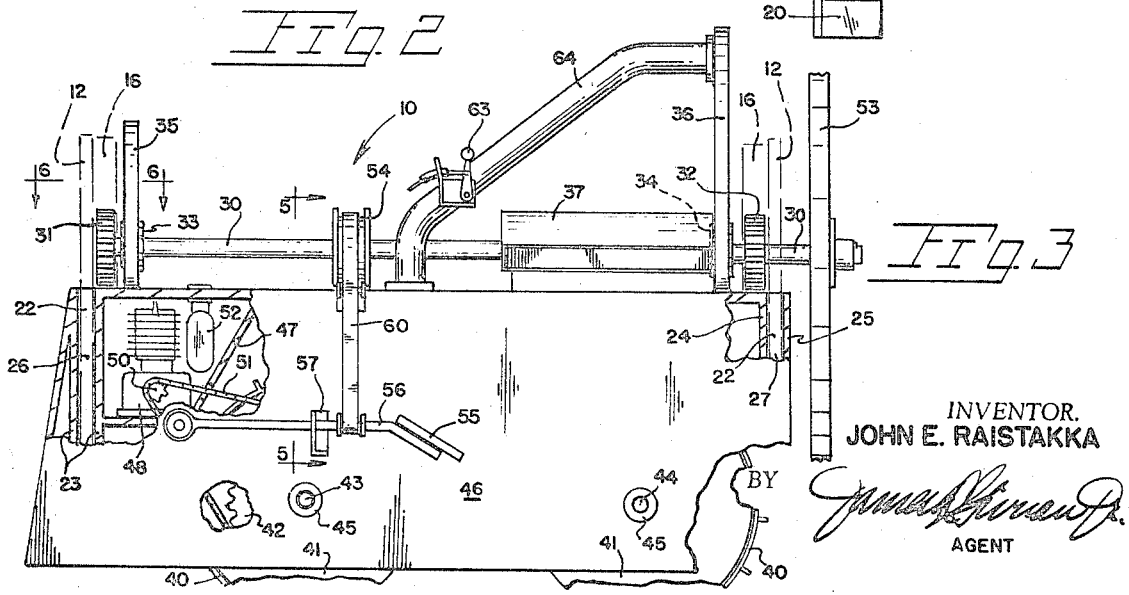
FIG. 3 is an enlarged side elevational view of the vehicle's body with associated supports being shown in dashed lines.

The vehicle body 10, as best shown in FIG. 3, comprises a fabricated metal structure of inverted boxlike construction having transverse openings at 22 adjacent the front and rear ends of the body to receive supports 12. The front opening 22 is defined by internal walls 23 spaced apart to provide a juxtaposed bearing surface for relative sliding movement with the support 12. The similar sized opening 22 at the rearward end of the vehicle body is defined by an end wall 24 of the body 10 and a false rear wall 25. Completing the enclosure defining the front and rear openings 22 are end walls as at 26 and 27 in FIGS. 3 and 6. From the foregoing description it will be apparent that the vehicle body 10 when in place on the frame 11 is adapted for vertical sliding movement on the supports 12 with the walls 23—27 mounting the vehicle body for vertical movement.

A longitudinally extending shaft 30 carries pinions 31 and 32 entrained with the gear racks 16 the shaft being journaled in bearings 33 and 34 adjacent its ends. The bearings are retained by body suspension plates 35 and 36 the latter additionally serving as a backrest for the operator seated at 37.

Housed internally within body 10 is a continuous traction belt at 40 entrained on rollers 41 the forward one of which is powered by means of a sprocket 42 keyed to a roller supporting shaft 43. The rear roller is also supported by a transversely extending shaft at 44 with both front and rear roller shafts being journaled at 45 in sidewalls 46 of the vehicle body. An internal partition at 47 in the vehicle body defines an engine compartment for the engine 48 having a drive sprocket 50 and roller chain 51. A fuel tank at 52 is also enclosed within the engine compartment.

Figure 2:
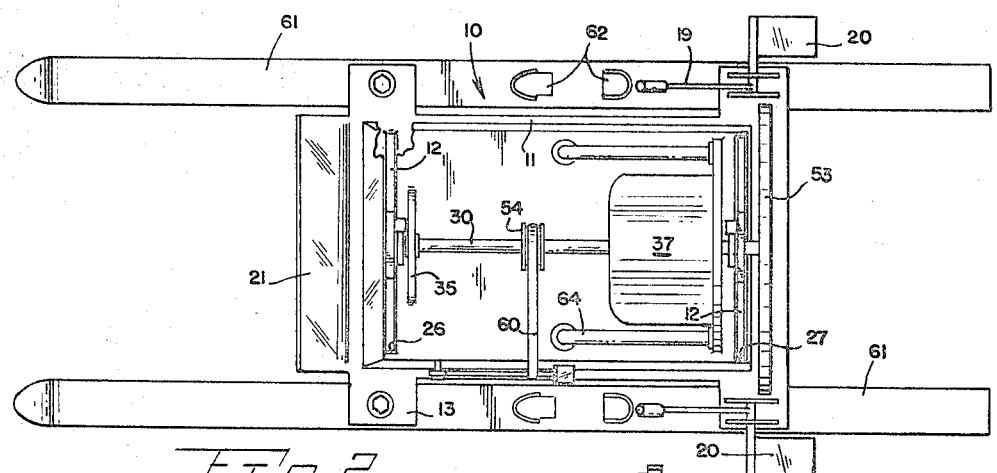
FIG. 2 is a top plan view of the vehicle of FIG. 1.

As best shown in FIGS. 1—3 a hand wheel is indicated at 53 affixed to the trailing end of the shaft 30 and thereby closely offset rearwardly from the body 10. The hand wheel, shaft 30 and the pinions 31—32 all rotate as a unit to permit raising of the vehicle body upon partial rotation of the wheel.

A lock 54 for shaft 30 is foot operated at 55 with foot-actuated lever 56 being swingably mounted to the sidewall of the body. A bracket at 57 in FIG. 5 serves to retain the lever 56 in a down or locked position in a slot 57A which effects a binding and locking of a drum 58 by a strap 60.

The ski members at 61 as aforesaid, may be of conventional configuration with a slightly greater width than a standard snow ski as made necessary by the additional weight of the mechanical components. I provide cup-shaped toe-and-heel pieces at 62 from which the operator's foot may be removed by a deliberate upward movement.

A throttle 63 is attached to one of a pair of bars 64 which serve as handholds for the operator.

In operation the operator may transfer his weight to the ski members during vertical movement of the vehicle body such movement being by means of manual rotation of hand wheel 53. Upon the most efficient vertical setting of the traction belt 40 being determined the body 10 is locked in place by foot actuation of the lock 54. Maximum snow penetration by the belt is achieved by letting the vehicle body descend into resting contact upon the frame 11.

Gradual changes in vehicle direction is achieved by exerting a drag by means of a drag plate 20 being swung downwardly into the snow while the operator leans into the direction of the turn.

Having thus described my invention what I claim as new and desire to secure by Letters Patent is:

I claim:

1. A ski-equipped snow vehicle comprising in combination:
   a frame interconnecting laterally spaced apart ski members and defining a frame opening for adjustable reception of a vehicle traction unit, said frame including upright support means adjacent each of its ends;
   a vehicle body supporting the seated vehicle operator and carried by said support means in a vertically adjustable manner, said vehicle body including a powered traction unit having a continuous belt with a horizontally disposed lower run occupying said frame opening when in a lowered position;
   a shaft journaled within said vehicle body and extending longitudinally the length thereof;
   a hand wheel carried by said shaft and located adjacent the operator's station permitting convenient manual rotation of the shaft by the vehicle operator;
   enmeshed gear means carried by said support means and the end segments of said shaft whereby rotation of said shaft will cause the height of said vehicle body and the belt of the traction unit to be adjusted relative to said frame and the skis; and
   locking means carried by said vehicle body and engageable with said shaft to lock the latter against rotation whereby the vehicle body and the traction unit carried thereby may be positioned in raised parallel relationship to the snow surface wherein the belt of the traction unit is raised from the snow surface.

2. A ski-equipped snow vehicle as claimed in claim 1, wherein said frame is of generally rectangular shape with said upright support means being disposed both adjacent the front and rearward ends thereof, said vehicle body including a seat structure for the vehicle operator, said body defining vertically extending openings formed therewithin at its forward and rearward ends to slidably engage said supports.

3. A ski-equipped snow vehicle as claimed in claim 1 wherein drag plates are carried by said frame outboard of each of the skis, swingable steering arms carried by the frame for independent operation by the vehicle operator for positioning of the drag plates for vehicle steering purposes.

4. A ski-equipped snow vehicle as claimed in claim 1 wherein said enmeshed gear means comprise pinions carried by said shaft and gear racks carried by the support means.

5. A ski-equipped snow vehicle as claimed in claim 4 wherein said locking means locks said shaft and the pinions carried thereby against rotational movement to prevent relative vertical movement between said supports and the vehicle body.